(12) United States Patent
Servel et al.

(10) Patent No.: US 11,914,020 B2
(45) Date of Patent: Feb. 27, 2024

(54) ENERGY-SAVING DEVICE AND METHOD FOR A PRESENCE DETECTION SYSTEM FOR A MOTOR VEHICLE

(71) Applicant: VITESCO TECHNOLOGIES GmbH, Hannover (DE)

(72) Inventors: Eric Servel, Toulouse (FR); Cédric Vergnieres, Toulouse (FR); Wladia Waszak, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 454 days.

(21) Appl. No.: 17/339,042

(22) Filed: Jun. 4, 2021

(65) Prior Publication Data

US 2021/0382162 A1  Dec. 9, 2021

(30) Foreign Application Priority Data

Jun. 5, 2020  (FR) ...................................... 2005895

(51) Int. Cl.
*B60R 25/31* (2013.01)
*G01S 13/56* (2006.01)
(Continued)

(52) U.S. Cl.
CPC .............. *G01S 13/56* (2013.01); *B60R 25/01* (2013.01); *B60R 25/245* (2013.01); *B60R 25/31* (2013.01); *B60R 25/403* (2013.01)

(58) Field of Classification Search
CPC ....... B60R 25/01; B60R 25/245; B60R 25/31; B60R 25/403; G01S 13/536; G01S 13/56; G01S 13/931; G01S 7/35; G01S 7/4008
See application file for complete search history.

(56) References Cited

U.S. PATENT DOCUMENTS

| 4,736,382 | A | * | 4/1988 | O'Meara | ............... | H01S 3/0064 |
| | | | | | | 359/287 |
| 5,900,834 | A | | 5/1999 | Kubinec | | |
| 2018/0170309 | A1 | | 6/2018 | McMahon et al. | | |

OTHER PUBLICATIONS

Wojciech Debski, et al., "24 GHz Transceiver Front-End with Integrated Ramp Generator", Proceedings of the 6th European Microwave Integrated Circuits Conference, 2011 European, IEEE, Oct. 10, 2011, pp. 21-24 (4 pages).

(Continued)

*Primary Examiner* — Timothy A Brainard
(74) *Attorney, Agent, or Firm* — NIXON & VANDERHYE (57) ABSTRACT

A device for a presence detection system for detecting the presence of a user close to a motor vehicle is configured to: activate a piezoelectric element during an "awake" time interval to stabilize the piezoelectric element; then, control the supply of voltage to an oscillator and supply the oscillator with a reference electrical signal forming a current voltage reference, so the transceiver circuit transmits a signal during what is called a "transmission" time interval; during the transmission time interval, measure the frequency of a reflected signal resulting from the transmitted signal, measure the frequency of the transmitted signal, and determine a corrected reference based on the measured frequency of the transmitted signal, allowing the oscillator to operate at a target frequency value. This allows limiting the energy consumption of a transceiver device used to detect the presence of a user close to a motor vehicle.

20 Claims, 3 Drawing Sheets

(51) Int. Cl.
  *B60R 25/01* (2013.01)
  *B60R 25/24* (2013.01)
  *B60R 25/40* (2013.01)

(56) References Cited

OTHER PUBLICATIONS

"24 GHz Transceiver: BGT24LTR11. Evaluation board and system design. Revision 1.4", Technologies Infineon, Jul. 9, 2019, 23 pages.
Search Report and Written Opinion for FR Application No. 2005895 dated Dec. 4, 2020, 15 pages.

* cited by examiner

ENERGY-SAVING DEVICE AND METHOD
FOR A PRESENCE DETECTION SYSTEM
FOR A MOTOR VEHICLE

This application claims priority to FR Patent Application No. 2005895 filed Jun. 5, 2020, the entire contents of which are hereby incorporated by reference.

BACKGROUND OF THE INVENTION

Field of the Invention

The invention relates to the field of motor vehicles, and more particularly to a device and to a method for a presence detection system for detecting presence close to a vehicle. Such a system aims in particular to allow the opening of one or more opening elements of the vehicle, for example the trunk.

Description of the Related Art

In a motor vehicle, it is known practice to use sensors for detecting the presence of a user close to the vehicle in order to unlock the doors or to open the trunk. In the case of a door, the sensor is generally installed in the handle of the door. In the case of a trunk, the sensor is generally installed underneath the trunk, the sensor needing to be capable of detecting the passage of a foot of the user in front of said sensor.

One known sensor solution is based on capacitance measurements, this capacitance varying when a user is present close to the sensor with respect to a reference value characterizing the absence of a user close to the sensor. This type of sensor, called "capacitive" sensor, may however prove to be inaccurate, thereby reducing its effectiveness and its reliability.

In order to rectify this drawback, another known sensor solution is based on radar (acronym for "radio detection and ranging") technology, and consists in transmitting a high-frequency signal, with a frequency of for example 24 GHz, and in measuring the frequency of the reflected signal. To this end, the sensor comprises a microcontroller and a transceiver circuit. The transceiver circuit comprises an antenna and an oscillator for transmitting the high-frequency signal.

According to the standards in force, the high-frequency signal has to be transmitted within a predefined frequency range. In order to avoid the frequency of the transmitted signal being outside this range, it is known practice, in the prior art, to use a phase-locked loop (or PLL). When the circuit is started up and before the signal is transmitted, the oscillator is supplied with power during what is called a "stabilization" period, so that its frequency stabilizes. This stabilization is achieved within the transceiver circuit using the phase-locked loop. Another known embodiment for ensuring that the transmission is within the desired frequency range is that of frequency closed-loop control using a microcontroller that controls the supply of power to the transceiver circuit, measures the frequency using its own quartz oscillator, checks whether this frequency is actually equal to the value of a target frequency, adjusts the transmission frequency of the oscillator of the radar sensor if necessary, and then measures this transmission frequency again for checking purposes. Once this check has been performed, respectively once the oscillator has been stabilized by the phase-locked loop, the microcontroller controls the transceiver circuit so that it continuously transmits a signal, said signal being generated using the oscillator and transmitted using the antenna. The microcontroller then periodically measures the frequency of a Doppler signal resulting from the reflected signal, the frequency of the Doppler signal being a function of a frequency shift between the reflected signal and the signal transmitted by the transceiver circuit. A non-zero frequency shift reflects the presence of a user in the immediate proximity of the sensor. When the frequency of the reflected signal is identical to that of the transmitted signal, this by contrast reflects the absence of movement of a user in front of the sensor. Continuously transmitting a signal however proves to be particularly energy-consuming, this exhibiting a significant drawback in a motor vehicle.

In order to at least partially rectify this drawback, it is known practice to transmit the signal not continuously but periodically. The evolution of parameters such as the temperature of the oscillator and humidity may modify the transmission frequency of the oscillator, and therefore of the transceiver circuit. In the prior art, the oscillator of the radar sensor is therefore stabilized and the frequency of the oscillator of the radar sensor is checked before each signal transmission period. However, the phase of stabilizing the oscillator of the radar sensor and the phase of checking the frequency are particularly energy-consuming. In this case too, repeating this step therefore means a significant consumption of energy by the sensor.

The invention therefore aims to at least partially rectify these drawbacks.

SUMMARY OF THE INVENTION

To this end, a first subject of the invention is a device for a presence detection system for detecting the presence of a user close to a motor vehicle, said device being intended to be installed in said vehicle and comprising a microcontroller and a transceiver circuit, wherein:
  the transceiver circuit comprises an antenna and an oscillator, wherein the oscillator is configured so as to receive a supply voltage and a reference electrical signal, and to supply a transmission signal when it is supplied by the supply voltage, with a frequency of the transmission signal that is a function of a reference formed by a feature of the reference electrical signal, and wherein the antenna is configured so as to transmit said transmission signal from the oscillator so as to form a signal that is transmitted by the transceiver circuit;
  the transceiver circuit is configured so as to receive, via said antenna, a reflected signal resulting from the signal transmitted by the transceiver circuit;
  the microcontroller comprises a control unit and a piezoelectric element;
  the microcontroller is configured so as to supply the reference electrical signal to the oscillator, and to drive the supply of the supply voltage to the oscillator such that the transceiver circuit transmits periodically and during transmission time intervals;
  and wherein the control unit of the microcontroller is configured so as to implement the following steps, in this order:
  a) activate the piezoelectric element during what is called an "awake" time interval, in order to stabilize said piezoelectric element,
  b) once the piezoelectric element has stabilized, control the supply of voltage to the oscillator and supply the oscillator with a reference electrical signal associated with what is called a current reference, so that the transceiver circuit transmits a signal during a transmission time interval, c) during said transmission time interval:
using the stabilized piezoelectric element, measure the frequency of a Doppler signal resulting from said reflected signal, and
using the stabilized piezoelectric element, measure the frequency of the transmission signal supplied at the output of the oscillator, d) using a comparison between the value of a target frequency and the measurement of the frequency of the transmission signal, determine a corrected value of the reference, the corrected value of the reference making it possible to reduce a difference between the value of the target frequency and the measurement of the frequency of the transmission signal, when the oscillator is supplied with a voltage and receives said corrected reference.

In a manner known per se, the Doppler signal denotes a signal whose frequency is a function of a difference between the frequency of the reflected signal and the frequency of the signal transmitted by the transceiver circuit. This frequency difference increases with the speed of a target from which the reflected signal reflects. The target is formed here by the leg of the user.

The transceiver circuit and its oscillator are not supplied with power constantly, but intermittently and only during the transmission time intervals, so as to reduce the electricity consumption of the device according to the invention.

The transceiver circuit may be called "radar circuit".

The oscillator is configured so as to receive a supply voltage and a reference electrical signal. Preferably, the supply voltage is a signal that does not vary from one transmission time interval to another. By contrast, the reference electrical signal is a signal that may vary from one transmission time interval to another.

The feature of the reference electrical signal forming a reference may comprise at least one of the following: a voltage value (peak-to-peak value, average value, absolute value of a DC voltage, etc.), a current value (peak-to-peak value, average value, absolute value of a DC current, etc.), an output of a digital signal, etc. The reference may thus be a voltage reference, or a reference of a type other than a voltage reference, in particular a current reference, or a digital reference, etc.

During the measurement time interval, the frequency of the signal supplied at the output of the oscillator (transmission signal) is substantially equal to the frequency of the signal transmitted by the transceiver circuit, which is why the measurement of one is substantially equivalent to the measurement of the other.

The corrected reference may then be used as current reference, during a subsequent transmission time interval, preferably during the time interval directly following the transmission time interval in which said corrected reference is determined. In other words, the oscillator is then controlled using a predetermined reference, or current reference, that was determined in a previous step and in particular during a previous transmission time interval (using a measurement of the frequency of the signal supplied at the output of the oscillator). The invention thus makes it possible to avoid the transceiver circuit having to perform the frequency-checking phase before each signal transmission. This thus greatly reduces the electricity consumption of the device according to the invention in comparison with devices from the prior art. In particular, the invention makes it possible to dispense with systematically using a phase-locked loop at the input of the oscillator to stabilize its frequency to the target frequency before each signal transmission by the transceiver circuit. The invention requires the implementation of regular measurements of the frequency of the transmission signal. The frequency of the transmission signal is measured using the piezoelectric element, which has to be stabilized in terms of frequency beforehand. Nevertheless, the electricity consumption of the microcontroller during operation, including said piezoelectric element, is significantly lower than that of the transceiver circuit. The piezoelectric element also stabilizes more quickly than the oscillator. The stabilization of the piezoelectric element, required to implement the invention, therefore consumes much less energy than frequency stabilization of the oscillator itself, as is implemented in the prior art and in a phase-locked loop. The overall consumption of the device is thus able to be reduced significantly, for example by the order of 30 times, in comparison with devices from the prior art that are based on using a phase-locked loop before each signal transmission by the transceiver circuit. Furthermore, according to the invention, the frequency stabilization of the oscillator is based on a frequency measurement step, implemented during the transmission of the signal used to detect the presence of a user, during the transmission time interval. The frequency stabilization of the oscillator thus does not increase a total signal transmission duration for the oscillator, thereby making it possible to reduce the electrical energy consumption of the device in comparison with the prior art.

Advantageously, the control unit of the microcontroller is configured so as to use said corrected reference as current reference, during a subsequent transmission time interval. Preferably, said subsequent transmission time interval comprises at least the transmission time interval directly following the transmission time interval during which said measurement of the frequency of the transmission signal is implemented.

The control unit may be configured so as, in step d), to implement the following sub-steps:
compare the value of the target frequency and the measurement of the frequency of the transmission signal;
depending on whether the measurement of the frequency of the transmission signal is strictly greater or strictly less than the value of the target frequency, add or subtract an increment to or from the current reference, in order to obtain said corrected value of the reference.

When the frequency of the transmission signal is strictly greater (respectively less) than the value of the target frequency, an increment is added to (respectively subtracted from) the current reference, or an increment is subtracted from (respectively added to) the current reference. Advantageously, the microcontroller then comprises a memory that stores data including the value of the target frequency and the value of said increment.

The value of said increment is advantageously recorded in a preliminary calibration phase.

In addition or as a variant, the control unit may be configured so as, in step d), to implement the following step:
based on pre-recorded data linking the value of the frequency of the transmission signal and the value of the reference supplied to the oscillator, determine said corrected value of the reference.

Said pre-recorded data may comprise a table of values and/or a curve and/or a function linking the value of the frequency of the transmission signal and the value of the reference supplied to the oscillator.

Advantageously, the microcontroller then comprises a memory that stores said pre-recorded data linking the value of the frequency of the transmission signal and the value of the reference supplied to the oscillator.

Said pre-recorded data linking the value of the frequency of the transmission signal and the value of the reference supplied to the oscillator are advantageously recorded in a preliminary calibration phase.

Advantageously, the piezoelectric element is a quartz clock allowing the transmission frequency of the signal to be measured accurately.

Preferably, the duration of the awake time interval is between 100 µs and 10 ms, preferably between 500 µs and 5 ms.

Preferably, in an initialization phase following the powering on of the device and before the first transmission time interval of the transceiver circuit, the microcontroller is able to supply a voltage to the oscillator during what is called a "stabilization" time interval in order to stabilize said oscillator at the desired transmission frequency (preferably the target frequency) and thus determine an initial reference value. In particular, the control unit is advantageously configured so as, in an initialization phase following powering on of the device and before a first transmission time interval, to implement the following steps:

drive the supply of voltage to the oscillator during what is called a "stabilization" time interval;

during the stabilization time interval, drive stabilization, at the target frequency, of the transmission signal supplied at the output of the oscillator, and thus determine an initial value of the current reference for stabilizing the oscillator at the target frequency.

As a variant, the microcontroller is able to measure the temperature inside the device, preferably in the oscillator, and to select a predetermined reference value (or initial value of the current reference) for stabilizing the oscillator in terms of frequency (preferably the target frequency) at the measured temperature. This predetermined value may for example be listed in a table stored in a memory area, in particular a memory area of the microcontroller. In this embodiment, the device according to the invention comprises a temperature sensor, the sensitive element of which is advantageously arranged in the oscillator, and configured so as to supply a measurement signal to the microcontroller.

According to one aspect of the invention, the microcontroller is able to modify the period of the transmission and measurement time intervals, that is to say a ratio between a repetition frequency of the transmission time intervals and a repetition frequency of the steps of measuring the frequency of the transmission signal, in particular on the basis of the operating mode of the vehicle (normal mode or standby mode) in order to avoid the microcontroller measuring the frequency of the signal transmitted in each transmission time interval, thereby making it possible to save more energy.

Preferably, the device according to the invention furthermore comprises a battery and a switch, with the battery configured so as to supply said supply voltage to the oscillator, with the switch connected between the battery and the oscillator, and with the switch driven by the microcontroller such that the transceiver circuit transmits periodically and during the transmission time intervals.

Preferably, the control unit of the microcontroller is furthermore configured so as to detect the presence of a user in front of the device when the frequency of the reflected signal is different from the frequency of the transmission signal. This detection uses the measurement of the frequency of the Doppler signal. When the frequency of the reflected signal is equal to the frequency of the signal transmitted by the transceiver circuit (and therefore to the frequency of the transmission signal at the output of the oscillator), the frequency of the Doppler signal is zero, this reflecting the absence of movement of a target located in front of the device. The absence of a user in front of the device is deduced from this. When the frequency of the reflected signal is different from the frequency of the signal transmitted by the transceiver circuit (and therefore from the frequency of the transmission signal at the output of the oscillator), the frequency of the Doppler signal is non-zero, this reflecting the movement of a target, such as the foot of the user. The presence of a user in front of the device is deduced from this.

Preferably, the frequency of the transmission signal is a function of a voltage of the reference electrical signal, said reference thus forming a voltage reference.

Another subject of the invention is a presence detection device for detecting the presence of a user close to a motor vehicle, said device being designed to be installed in said vehicle and comprising a microcontroller and a transceiver circuit, said transceiver circuit comprising an antenna and an oscillator and being able to periodically transmit, during a transmission time interval and via said antenna, a signal at a target frequency from said oscillator and to receive a reflected signal resulting from the signal transmitted via said antenna, said microcontroller comprising a control unit and a piezoelectric element, said control unit being able to:

activate the piezoelectric element during what is called an "awake" time interval in order to stabilize said piezoelectric element, once the piezoelectric element has stabilized, control the supply of voltage to the oscillator based on a predetermined voltage reference at the stabilized frequency of the piezoelectric element (allowing the oscillator of the transceiver circuit to operate at the target frequency value) so that the transceiver circuit transmits a signal during what is called a "transmission" time interval, during said transmission time interval:
measure the frequency of a reflected (Doppler) signal resulting from the transmitted signal,
measure the frequency of the transmitted signal, based on the measurement of the frequency of the transmitted signal, determine a new voltage reference allowing the oscillator of the transceiver circuit to operate at the target frequency value of the signal, detect the presence of a user in front of the device when the frequency of the reflected signal is different from the frequency of the transmitted signal.

The invention also relates to a motor vehicle comprising at least one device as presented above.

The invention also relates to a method for detecting the presence of a user close to a motor vehicle based on a device as mentioned above, said method comprising the following steps:

a) during what is called an "awake" time interval, the control unit activates the piezoelectric element, in order to stabilize said piezoelectric element, b) once the piezoelectric element has stabilized, the microcontroller controls the supply of voltage to the oscillator and supplies the oscillator with the reference electrical signal associated with said current reference, so that the transceiver circuit transmits a signal during a transmission time interval, c) during said transmission time interval:
  the microcontroller measures the frequency of the Doppler signal resulting from said reflected signal, and
  the microcontroller measures the frequency of the transmission signal supplied at the output of the oscillator,
d) using a comparison between the value of a target frequency and the measurement of the frequency of the transmission signal, the microcontroller determines a corrected value of the reference, the corrected value of the reference making it possible to reduce a difference between the value of the target frequency and the measurement of the frequency of the transmission signal, when the oscillator is supplied with a voltage and receives said corrected reference.

Advantageously, the method according to the invention furthermore comprises a step of detecting the presence of a user in front of the device when the frequency of the reflected signal is different from the frequency of the transmission signal.

Preferably, the piezoelectric element is a quartz clock.

Again preferably, the duration of the awake time interval is between 100 μs and 10 ms, preferably between 500 μs and 5 ms.

The invention also covers a method for detecting the presence of a user close to a motor vehicle based on a device as presented above, said method comprising the following steps:
  the control unit activates the piezoelectric element during what is called an "awake" time interval for stabilizing said piezoelectric element,
  once the piezoelectric element has stabilized, the microcontroller controls the supply of voltage to the oscillator based on a predetermined voltage reference at the stabilized frequency of the piezoelectric element so that the transceiver circuit transmits a signal during what is called a "transmission" time interval,
  during said transmission time interval:
    the microcontroller measures the frequency of a reflected signal resulting from the transmitted signal,
    the microcontroller measures the frequency of the transmitted signal,
  based on the measurement of the frequency of the transmitted signal, the microcontroller determines a new voltage reference allowing the oscillator of the transceiver circuit to operate at the target frequency value of the signal,
  detecting the presence of a user in front of the device when the frequency of the reflected signal is different from the frequency of the transmitted signal.

BRIEF DESCRIPTION OF THE DRAWINGS

Other features and advantages of the invention will become more clearly apparent from reading the following description. This description is purely illustrative and should be read with reference to the attached drawings, in which.

DESCRIPTION OF THE PREFERRED EMBODIMENTS

The device according to the invention is intended to be installed in a motor vehicle in order to detect the presence of a user close to said vehicle, in particular the presence of a foot or of a hand of said user.

Figure 1:
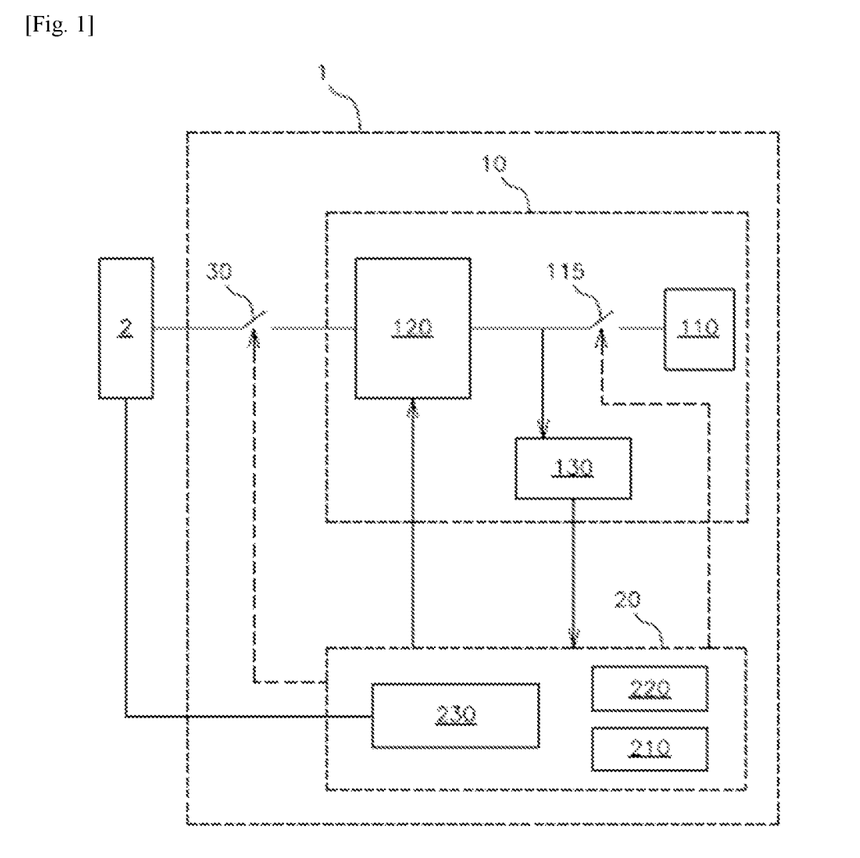
FIG. 1 schematically illustrates one embodiment of the device according to the invention.

FIG. 1 shows one embodiment of the device 1 according to the invention. The device 1 comprises a transceiver circuit 10 and a microcontroller 20 that are both supplied with power by a battery 2 of the vehicle, and a switch 30, connected between the battery 2 and the transceiver circuit 10 and able to be controlled by the microcontroller 20 so as to supply or not supply electrical energy to said transceiver circuit 10.

Transceiver Circuit 10

The transceiver circuit 10 comprises an antenna 110 and an oscillator 120.

The transceiver circuit 10 is able to periodically transmit a signal at a predetermined frequency, during what is called a "transmission" time interval, from said oscillator 120 and via said antenna 110, and to receive a reflected signal resulting from the signal transmitted via the antenna 110. To this end, the oscillator 120 is configured so as to receive a supply voltage from the battery 2 when the switch 30 is closed, and so as not to receive any supply voltage when the switch 30 is open. Furthermore, the oscillator 120 is configured such that its oscillating frequency is driven using a reference electrical signal supplied by the microcontroller 20. In particular, the oscillating frequency of the oscillator 120, and therefore the frequency of the transmission signal supplied at the output of the oscillator 120, is a function of a reference formed by a feature of the reference electrical signal. Hereinafter, but without limitation, this reference is a voltage reference formed by the absolute value of the voltage of the reference electrical signal (DC voltage, taking a fixed value during a transmission time interval under consideration). The oscillator 120 may for example be designed to operate at a target frequency of 24.2 GHz, in a manner known per se for civilian radar applications. The output of the oscillator is connected to the antenna 110 in order for a signal to be transmitted by the transceiver circuit 10.

In this example and advantageously, the transceiver circuit 10 furthermore comprises a switch 115 connected between the output of the oscillator 120 and the antenna 110 and able to be controlled by the microcontroller 20.

Here and advantageously, the transceiver circuit 10 furthermore comprises a frequency divider 130, connected to the microcontroller 20, and by way of which the microcontroller 20 measures the frequency of the transmission signal at the output of the oscillator. The frequency divider 130 makes it possible
to reduce a measured value of the frequency of the transmission signal supplied by the oscillator, in order to bring this value into a range able to be used numerically by the microcontroller. In this example, and without limitation, the frequency divider 130 divides the transmission frequency by $2^{20}=1048576$. The transceiver circuit 10 furthermore comprises a circuit, not shown, configured so as to receive a reflected signal received by the antenna 110 and convey this signal to the microcontroller 20.

Microcontroller 20

The microcontroller 20 makes it possible to control the transceiver circuit 10 and comprises a control unit 210, a memory area 220 and a piezoelectric element 230.

The control unit 210 is able to activate the piezoelectric element 230 during what is called an "awake" time interval in order to stabilize said piezoelectric element 230. Preferably, the duration of the awake time interval is between 0.1 and 1 ms. The piezoelectric element 230 serves as a clock for implementing frequency measurements with the microcontroller 20.

The control unit 210 is able, once the piezoelectric element has stabilized, to control the supply of voltage to the oscillator 120 (here via closing the switch 30) and to supply the oscillator with a reference electrical signal. A feature of the reference electrical signal, here an absolute voltage value, forms a predetermined reference, here a predetermined voltage reference. Said predetermined voltage reference advantageously allows the oscillator 120 to operate at the target frequency value of the signal to be transmitted. In practice, the usage conditions (in particular the temperature of the oscillator 120) may cause a frequency drift of the signal transmitted by the oscillator, with a constant value of the voltage reference. For the sake of clarity, a definition is therefore given of a current voltage reference that denotes the voltage reference delivered to the oscillator 120 at a given time. Said current voltage reference allows the oscillator 120 to operate at the target frequency value of the signal to be transmitted under initial usage conditions. After a certain usage period of the device 1, the current voltage reference no longer allows the oscillator 120 to operate exactly at the target frequency value of the signal to be transmitted, due to a change in the usage conditions of the device 1. The oscillator 120 then operates at a value slightly offset in relation to said target frequency, for example greater than or less than the target frequency. The supply of voltage to the oscillator 120 for its part allows a signal to be transmitted via the antenna 110 during what is called a "transmission" time interval.

In this preferred example, the piezoelectric element 230 is in the form of a quartz clock, which makes it possible to oscillate very accurately at the desired frequency value so as to make it possible to measure desired frequency values, in particular the frequency of the transmission signal at the output of the oscillator 120.

The control unit 210 is able, during a transmission time interval, to measure the frequency of a Doppler signal resulting from the reflected signal. Measuring the frequency of a Doppler signal in a context of detecting the presence of a user in front of a vehicle is a well-known technique that will not be described further here. It may simply be stated that the Doppler signal is formed using a multiplier that receives, at input, the reflected signal of frequency $f_O$, on the one hand, and a portion of the signal of frequency $f_I$ supplied at the output of the oscillator 120, on the other hand, and that supplies, at output, a signal one of whose components is at the frequency $|f_O - f_I|$. This component, which forms the Doppler signal, is isolated using frequency filters. The device 1 has various elements, not shown, allowing said measurement of a Doppler signal, in particular said multiplier, and a coupler arranged at the output of the oscillator 120 and able to direct the majority of the signal to the antenna 110 and a small portion of the signal to the multiplier.

In parallel, during this same transmission time interval, the control unit 210 is also able to measure the frequency of the signal transmitted by the antenna 110 and to determine a new reference (here a new voltage reference) on the basis of the frequency of the transmitted signal thus measured, allowing the oscillator 120 to operate at the target frequency in the next transmission. In practice, the control unit measures the frequency of the signal at the output of the oscillator 120, upstream of the antenna 110, it being understood that the frequency of the signal transmitted by the antenna is substantially equal to the frequency of the signal transmitted by the oscillator 120 when the switch 115 is closed. The new reference may be called "corrected value of the reference". This is the value of the reference that allows the oscillator to operate at the value of the target frequency under the current usage conditions.

The frequency of the transmitted signal may advantageously be measured using a counter (not shown), for example driven by the control unit 210 and electrically connected to the frequency divider 130. The counter uses the piezoelectric element 230 as a clock. According to the invention, the piezoelectric element 230 should therefore be stabilized in terms of frequency before the measurement of the frequency of the transmitted signal.

The value of the predetermined reference may have been determined in the previous transmission time interval or else in any previous transmission time interval. Next, the new reference that is obtained is used as a reference in subsequent transmission time intervals. Preferably, a new value of the reference is determined periodically, for example every 3 or 4 transmission time intervals.

In an initialization phase following the powering on of the device 1 and before the first transmission time interval of the transceiver circuit 10, the microcontroller 20 may be able to supply a voltage to the oscillator 120 and supply it with a reference electrical signal during what is called a "stabilization" time interval in order to stabilize said oscillator at the desired transmission frequency (called target frequency here) and thus determine an initial reference value.

As a variant, the microcontroller 20 may be able to measure an initial temperature inside the device 1, preferably in the oscillator 120, and to deduce therefrom an initial reference value for stabilizing the oscillator 120 in terms of frequency at the desired transmission frequency (called target frequency here), at the measured temperature. This variant advantageously uses a table stored in a memory, linking reference values and temperature values for operation of the oscillator 120 at the target frequency. Said memory is for example the memory area 220 of the microcontroller 20, or an added memory, not shown. In one embodiment, the microcontroller 20 is able to modify the period of the transmission and measurement time intervals, in particular on the basis of the operating mode of the vehicle (normal mode or standby mode) in order to avoid the microcontroller 20 measuring the frequency of the signal transmitted in each transmission time interval, thereby making it possible to save more energy. In particular, the transmission period of the signal by the transceiver circuit (via the oscillator 120 and the antenna 110), as well as the measurement period of the frequency of the signal transmitted by the transceiver circuit, may be adapted on the basis of variations in temperature and humidity. For example, if the temperature and humidity do not vary or vary only slightly and/or if the vehicle is in standby mode, the microcontroller 20 may increase the transmission period (that is to say decrease the repetition frequency of the transmission time intervals) and also not measure the frequency of the signal transmitted in each transmission. By contrast, if the temperature and humidity vary rapidly and/or if the vehicle is in a normal operating mode, the microcontroller may reduce the transmission period (that is to say increase the repetition frequency of the transmission time intervals) and also measure the frequency of the signal transmitted in each transmission.

The control unit 210 is configured so as to measure the frequency of the Doppler signal, obtained from the signal transmitted by the transceiver circuit 10 and reflected (or backscattered) from a user (for example his moving foot).

Preferably, the control unit 210 is then able to detect the presence of a user in front of the device 1 when the frequency of the reflected signal is different from the frequency of the transmitted signal (non-zero frequency of the Doppler signal). As a variant, the presence detection is implemented in an added device.

In order to execute all of these functions, the microcontroller 20 is able to implement a list of instructions stored in its memory area 220.

Implementation

Figure 2:
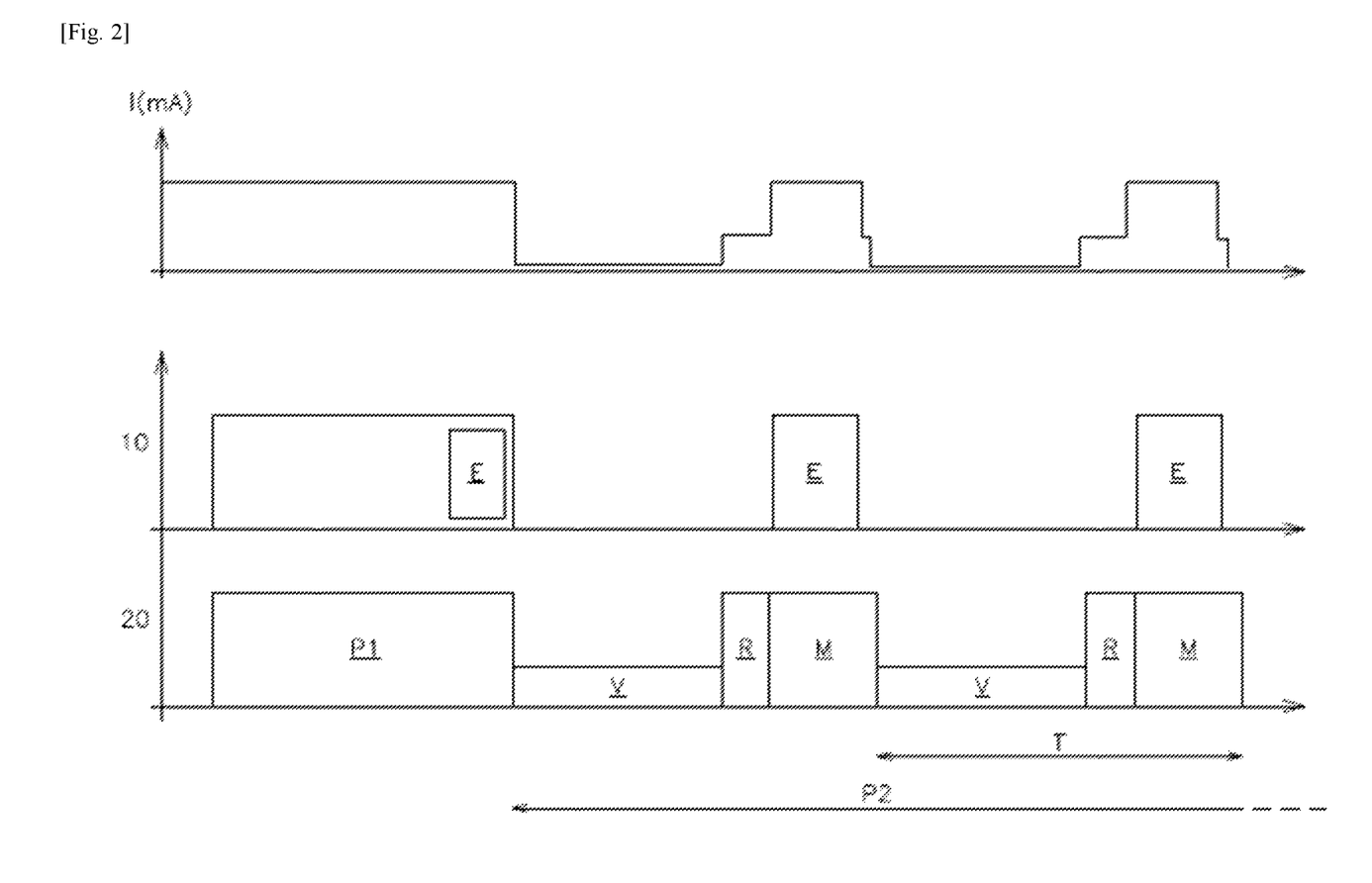
FIG. 2 schematically illustrates one example of the operation of the device according to the invention.
Figure 3:
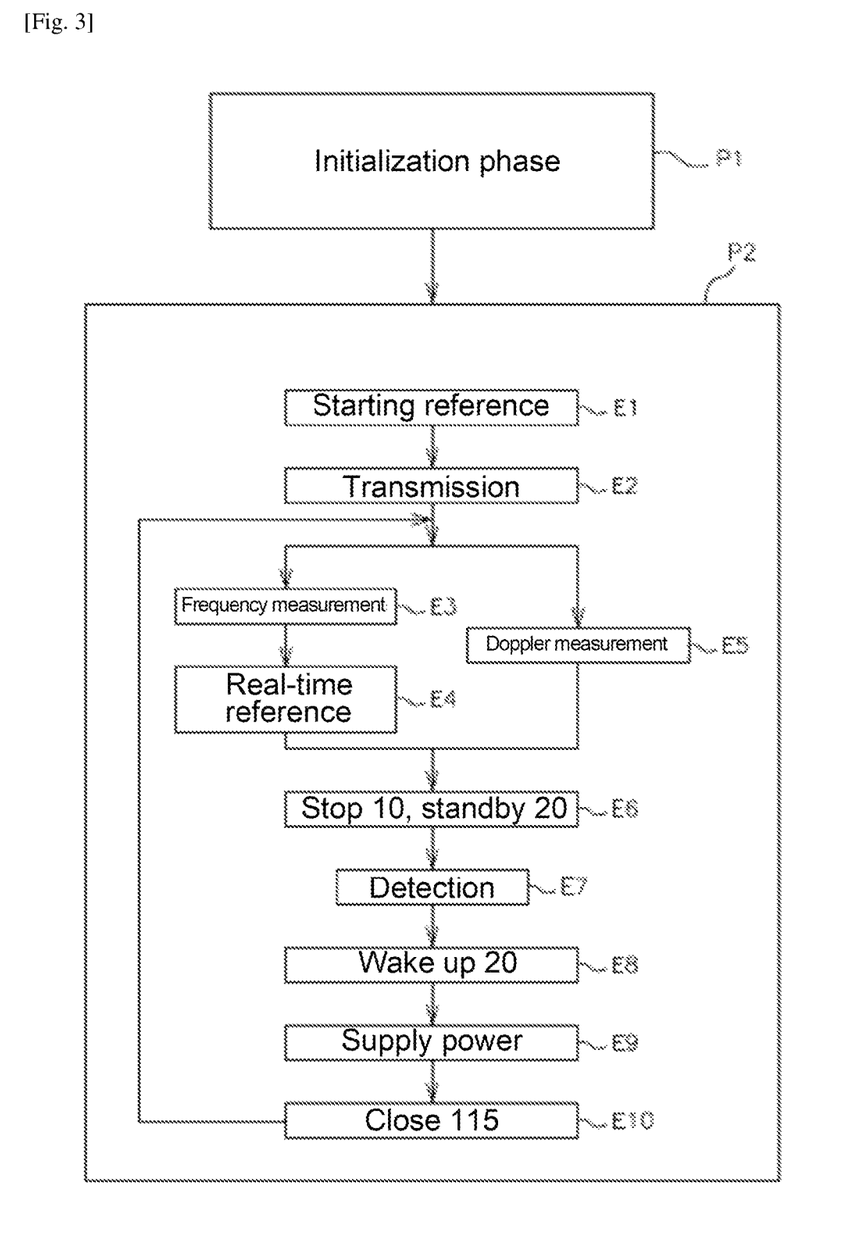
FIG. 3 schematically illustrates one embodiment of the method according to the invention.

The invention will now be described in terms of the implementation thereof with reference to FIGS. 2 and 3. FIG. 2 shows one example of the operation of the device 1, in which the graph at the top shows the evolution of the strength of the current consumed by the device 1, the graph in the middle shows periodic transmission time intervals E of the transceiver circuit 10 and the graph at the bottom shows an initialization phase P1 and a measurement phase P2 comprising periodic standby V, awake R and measurement M time intervals (of period T).

First of all, when the device 1 is started up, the microcontroller performs an initialization phase P1 in which it opens the switch 115 (in order to prevent a signal at the output of the oscillator 120 being transmitted to the antenna 110), closes the switch 30 (in order to supply a voltage to the oscillator 120), and then applies a reference electrical signal, forming a reference, at the input of the oscillator 120. During this initialization phase P1, the microcontroller 20 searches for the value of the reference that is necessary for the oscillator 120 to transmit at a target frequency. Said target frequency is located within the frequency range authorized by the standard, and has a value of for example 24.2 GHz. In doing so, the oscillator 120 will need to stabilize in terms of frequency during a non-zero time interval. In order to stabilize the oscillator 120 so that the signal transmitted (by the oscillator 120 and therefore by the transceiver circuit 10) is at the required target frequency, the microcontroller 20 adjusts the reference at the input of the oscillator 120 through trial and error or through closed-loop control if necessary. The reference is formed here, but without limitation, by a voltage. As a variant, it may be formed by any feature of an electrical signal other than its voltage, for example its current. Once the oscillator 120 has stabilized, the microcontroller 20 records, in its memory area 220, the reference defined at the input of the oscillator as starting reference, or initial reference. The microcontroller 20 may then optionally close the switch 115 in order to check the influence of the connection to the antenna 110 on the frequency of the oscillator 120, and refine the initial reference value even more. Specifically, the frequency of the oscillator 120 may in particular be influenced by the connection of the antenna 110 to said oscillator 120. It will be noted that, in the initialization phase P1, there is no transmission of a signal by the transceiver circuit 10 (or else only at the end of the initialization phase P1, once the frequency of the oscillator 120 has stabilized and when the switch 115 is closed). Specifically, in this phase of searching for an initial reference, the transmitted frequency could be outside the authorized range. Nevertheless, the transceiver circuit 10 is still supplied with electricity during this initialization phase P1 (the switch 30 being closed).

Once the initialization phase P1 is finished, the device 1 operates in what is called a "measurement" phase P2. This measurement phase P2 will be repeated periodically. In a step E1 of the measurement phase P2, the microcontroller 20 first of all closes the switch 115, keeps the switch 30 closed, and applies the starting reference determined during the initialization phase P1 at the input of the oscillator 120. The oscillator 120 is thus directly operational. Specifically, it then directly transmits a signal oscillating substantially at the target frequency for which it was calibrated beforehand in the initialization phase P1. When the usage conditions such as the temperature and/or humidity have not changed since the initialization phase P1, the signal transmitted by the oscillator 120 oscillates exactly at the target frequency. As a variant, said usage conditions may have changed since the initialization phase P1. In this case, the reference defined in the initialization phase P1 no longer corresponds to a transmission at the target frequency, and the signal transmitted by the oscillator 120 oscillates at a frequency different from said target frequency. Once the starting reference has been applied at the input of the oscillator 120, the transceiver circuit 10 transmits a signal during a first what is called "transmission" time interval E via the antenna 110 in a step E2. One function of the signal transmitted by the transceiver circuit 110 is that of detecting a nearby user. The signal transmitted by the transceiver circuit 10 corresponds to the signal supplied by the oscillator 120 and then transmitted by the antenna 110. This signal therefore oscillates substantially at the same frequency as the oscillator, the switch 115 being closed.

During the transmission of the signal by the transceiver circuit 10, the control unit 210 of the microcontroller 20 measures, in a step E3, the frequency of the signal transmitted by the transceiver circuit 10. In practice, said measurement is carried out on the signal transmitted by the oscillator 120, via the frequency divider 130. The frequency divider 130 reduces the frequency of the signal transmitted by the oscillator 120 to a value able to be measured within the microcontroller 20. The frequency measurement uses a counter of the microcontroller 20 as well as a clock, formed here by the piezoelectric element 230.

In a step E4, the microcontroller 20 determines a corrected value of the reference, also called new reference, or "real-time" reference. The real-time reference is determined based on the measurement of the frequency of the transmitted signal. It would allow the oscillator 120 of the transceiver circuit 10 to get close to operating at the exact value of the target frequency if said oscillator 120 were to be supplied with said real-time reference. It will therefore allow the oscillator 120 to get close to operating at the exact value of the target frequency in a following transmission time interval if the oscillator 120 is supplied with said real-time reference. This real-time reference is stored in the memory area 220.

In practice, the real-time reference may be obtained simply by comparing the target frequency with the frequency measured in step E3. If the target frequency is greater than the frequency measured in step E3, an increment is added to, respectively subtracted from, the current reference (that is to say the reference applied at the input of the oscillator during said step E3). By contrast, if the target frequency is less than the frequency measured in step E3, an increment is subtracted from, respectively added to, said current reference. The value of the increment is advantageously determined in a preliminary calibration step. This solution does not necessarily always allow operation exactly at the target frequency, but it does however avoid the buildup of excessive frequency drifts over time. It is thus ensured that the oscillator 120 always transmits within a desired frequency band.

As a variant, the real-time reference may be obtained using a table of values and/or a curve and/or a function, linking the value of the frequency of the signal transmitted by the oscillator 120 (respectively the transceiver circuit) and the value of the reference at the input of the oscillator. The data that are used (table of values and/or curve and/or function) are advantageously determined in a preliminary calibration step.

During this transmission time interval E, in parallel with steps E3 and E4, the control unit 210 of the microcontroller 20 also measures, in a step E5, the frequency of the Doppler signal obtained using the reflected signal.

At the end of the transmission time interval E, and in a step E6, the microcontroller 20 stops supplying a voltage to the oscillator 120, so that it stops operating and the transceiver circuit 10 stops transmitting the signal, thus saving the electrical energy of the vehicle. To this end, the microcontroller 20 drives the opening of the switch 30 and the opening of the switch 115. It also stops sending a reference to the input of the oscillator 120.

The control unit 210 detects, in an optional step E7, the presence of a user close to the device 1. This detection is based on detecting a difference between the frequency of the reflected signal and the frequency of the signal transmitted by the transceiver circuit (Doppler effect), synonymous with a movement of a nearby user, for example the passage of a foot. When the control unit 210 detects the presence of a user close to the device 1, it activates a function of the vehicle, such as for example unlocking the opening element in which the device 1 is installed.

Once steps E6 and possibly E7 are finished, the microcontroller 20 puts itself into a standby state during a standby time interval V in which it consumes little electrical energy.

In a step E8, just before the start of the following transmission time interval E, the control unit 210 of the microcontroller 20 wakes up. It then controls, in a step E9, the supply of voltage to the piezoelectric element 230 during what is called an "awake" time interval R, allowing the piezoelectric element 230 to stabilize, the switch 115 and the switch 30 still being open.

At the end of this awake time interval R, and in a step E10, the control unit 210 closes the switch 30 and the switch 115 such that a signal is transmitted by the transceiver circuit 10 during a new transmission time interval E.

The microcontroller 20 then runs through steps E3 to E10 again periodically as long as the device 1 is operational, using, in each transmission time interval E, a previously defined reference (either defined in the initialization phase, in particular for the first transmission time interval, or defined and stored (memorized) in the memory in a previous transmission time interval, in particular the transmission time interval directly preceding the transmission time interval under consideration).

It will be noted that, as a variant, steps E3 and E4 might not be implemented systematically in each transmission time interval E, but in a manner more spaced apart in time. Specifically, if the temperature and the humidity level vary very slowly or do not vary, it may be advantageous to keep the same reference for multiple consecutive transmission time intervals E in order to avoid measuring the frequency of the transmitted signal and calculating a new real-time reference in each transmission time interval E, thus saving electrical energy.

It will also be noted that the device 1 may operate both during normal operation of the vehicle (electrical system of the vehicle activated, for example engine started) and during operation in standby mode of the vehicle (electrical system of the vehicle in standby mode, engine turned off).

The invention is not limited to the examples described above, and also covers numerous variants, including in particular:
- variants in which the oscillator is not controlled by an absolute value of the voltage of a reference electrical signal, but by any other feature of said signal, such as an absolute current value, an average current or voltage value, etc.;
- variants without the switch 115, the initialization phase being able to be implemented in an environment that temporarily authorizes transmission outside of the authorized frequency band with a sufficiently low power;
- variants in which the driving of the switch 30 is replaced with driving of the battery itself;
- variants in which the step of detecting a user is performed outside the microcontroller, using the Doppler frequency measurement supplied by said microcontroller, etc.

The invention claimed is:

1. A device (1) for a presence detection system for detecting the presence of a user close to a motor vehicle, said device (1) being intended to be installed in said vehicle and comprising a microcontroller (20) and a transceiver circuit (10), wherein:
   the transceiver circuit (10) comprises an antenna (110) and an oscillator (120), wherein the oscillator (120) is configured so as to receive a supply voltage and a reference electrical signal, and to supply a transmission signal when it is supplied by the supply voltage, with a frequency of the transmission signal that is a function of a reference formed by a feature of the reference electrical signal, and wherein the antenna (110) is configured so as to transmit said transmission signal from the oscillator (120) so as to form a signal that is transmitted by the transceiver circuit (10);
   the transceiver circuit (10) is configured so as to receive, via said antenna (110), a reflected signal resulting from the signal transmitted by the transceiver circuit (10);
   the microcontroller (20) comprises a control unit (210) and a piezoelectric element (230);
   the microcontroller (20) is configured so as to supply the reference electrical signal to the oscillator (120), and to drive the supply of the supply voltage to the oscillator (120) such that the transceiver circuit (10) transmits periodically and during transmission time intervals (E);
   and wherein the control unit (210) of the microcontroller (20) is configured so as to implement the following steps, in this order:
   a) activate (E9) the piezoelectric element (230) during what is called an "awake" time interval (R), in order to stabilize said piezoelectric element (230),
   b) once the piezoelectric element (230) has stabilized, control (E1) the supply of voltage to the oscillator (120) and supply the oscillator (120) with a reference electrical signal associated with what is called a current reference, so that the transceiver circuit (10) transmits (E2) a signal during a transmission time interval (E),
   c) during said transmission time interval (E):
      using the stabilized piezoelectric element (230), measure (E5) the frequency of a Doppler signal resulting from said reflected signal, and
      using the stabilized piezoelectric element (230), measure (E3) the frequency of the transmission signal supplied at the output of the oscillator (120),
   d) using a comparison between the value of a target frequency and the measurement of the frequency of the transmission signal, determine (E4) a corrected value of the reference, the corrected value of the reference making it possible to reduce a difference between the value of the target frequency and the measurement of the frequency of the transmission signal, when the oscillator (120) is supplied with a voltage and receives said corrected reference.

2. The device (1) as claimed in claim 1, wherein the control unit (210) of the microcontroller (20) is configured so as to use said corrected reference as current reference, during a subsequent transmission time interval (E).

3. The device (1) as claimed in claim 2, wherein the control unit (210) is configured so as, in step d), to implement the following sub-steps:
compare the value of the target frequency and the measurement of the frequency of the transmission signal;
depending on whether the measurement of the frequency of the transmission signal is strictly greater or strictly less than the value of the target frequency, add or subtract an increment to or from the current reference, in order to obtain said corrected value of the reference.

4. The device (1) as claimed in claim 2, wherein the control unit (210) is configured so as, in step d), to implement the following step:
based on pre-recorded data linking the value of the frequency of the transmission signal and the value of the reference supplied to the oscillator (120), determine said corrected value of the reference.

5. The device (1) as claimed in claim 2, wherein the piezoelectric element (230) is a quartz clock.

6. The device (1) as claimed in claim 1, wherein the control unit (210) is configured so as, in step d), to implement the following sub-steps:
compare the value of the target frequency and the measurement of the frequency of the transmission signal;
depending on whether the measurement of the frequency of the transmission signal is strictly greater or strictly less than the value of the target frequency, add or subtract an increment to or from the current reference, in order to obtain said corrected value of the reference.

7. The device (1) as claimed in claim 1, wherein the control unit (210) is configured so as, in step d), to implement the following step:
based on pre-recorded data linking the value of the frequency of the transmission signal and the value of the reference supplied to the oscillator (120), determine said corrected value of the reference.

8. The device (1) as claimed in claim 1, wherein the piezoelectric element (230) is a quartz clock.

9. The device (1) as claimed in claim 1, wherein the duration of the awake time interval is between 100 μs and 10 ms.

10. The device (1) as claimed in claim 1, wherein the control unit (210) is configured so as, in an initialization phase (P1) following powering on of the device (1) and before a first transmission time interval (E), to implement the following steps:
drive the supply of voltage to the oscillator (120) during what is called a "stabilization" time interval;
during the stabilization time interval, drive stabilization, at the target frequency, of the transmission signal supplied at the output of the oscillator (120), and thus determine an initial value of the current reference for stabilizing the oscillator (120) at the target frequency.

11. The device as claimed in claim 1, wherein the microcontroller (20) is configured so as to measure a temperature inside the device (1), and to deduce an initial value of the current reference from this for stabilizing the oscillator (120) at the target frequency, at the measured temperature.

12. The device of claim 11, wherein the temperature is measured in the oscillator.

13. The device (1) as claimed in claim 1, wherein the microcontroller (20) is configured so as to modify a ratio between a repetition frequency of the transmission time intervals and a repetition frequency of the steps of measuring the frequency of the transmission signal (E3), so as to avoid the microcontroller (20) measuring the frequency of the transmission signal in each transmission time interval (E).

14. The device of claim 13, wherein the microcontroller is configured to modify the ratio between the repetition frequency of the transmission time intervals and the repetition frequency of the steps of measuring the frequency of the transmission signal (E3) on the basis of an operating mode of the vehicle.

15. The device (1) as claimed in claim 1, furthermore comprising a battery (2) and a switch (30), with the battery (2) configured so as to supply said supply voltage to the oscillator (120), with the switch (30) connected between the battery (2) and the oscillator (120), and with the switch (30) driven by the microcontroller (20) such that the transceiver circuit (10) transmits periodically and during the transmission time intervals (E).

16. The device (1) as claimed in claim 1, wherein the control unit (210) of the microcontroller (20) is furthermore configured so as to detect (E7) the presence of a user in front of the device (1) when the frequency of the reflected signal is different from the frequency of the transmission signal.

17. The device (1) as claimed in claim 1, wherein the frequency of the transmission signal is a function of a voltage of the reference electrical signal, said reference thus forming a voltage reference.

18. A motor vehicle comprising at least one device (1) as claimed in claim 1.

19. A method for detecting the presence of a user close to a motor vehicle based on a device (1) as claimed in claim 1, said method comprising the following steps:
a) during what is called an "awake" time interval (R), the control unit (210) activates the piezoelectric element (230), in order to stabilize said piezoelectric element (230),
b) once the piezoelectric element (230) has stabilized, the microcontroller (20) controls the supply of voltage to the oscillator (120) and supplies the oscillator with the reference electrical signal associated with said current reference, so that the transceiver circuit (10) transmits a signal during a transmission time interval (E),
c) during said transmission time interval (E):
the microcontroller (20) measures the frequency of the Doppler signal resulting from said reflected signal, and
the microcontroller (20) measures the frequency of the transmission signal supplied at the output of the oscillator (120),
d) using a comparison between the value of a target frequency and the measurement of the frequency of the transmission signal, the microcontroller (20) determines a corrected value of the reference, the corrected value of the reference making it possible to reduce a difference between the value of the target frequency and the measurement of the frequency of the transmission signal, when the oscillator (120) is supplied with a voltage and receives said corrected reference.

20. The method as claimed in claim 19, further comprising a step of detecting the presence of a user in front of the device (1) when the frequency of the reflected signal is different from the frequency of the transmission signal.

* * * * *